(12) United States Patent
Keshavarz et al.

(10) Patent No.: US 8,551,299 B2
(45) Date of Patent: * Oct. 8, 2013

(54) METHODS OF PRODUCING HYDROCHLORIC ACID FROM HYDROGEN GAS AND CHLORINE GAS

(75) Inventors: Majid Keshavarz, Pleasanton, CA (US); Saroj Kumar Sahu, Mountain House, CA (US); Chockkalingam Karuppaiah, Fremont, CA (US); Ge Zu, San Jose, CA (US); Suresh Kumar Surapalan Nair, Fremont, CA (US); Vasanthan Mani, Fremont, CA (US)

(73) Assignee: Deeya Energy, Inc., Fremont, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 12/790,613

(22) Filed: May 28, 2010

(65) Prior Publication Data

US 2011/0081561 A1    Apr. 7, 2011

Related U.S. Application Data

(60) Provisional application No. 61/182,335, filed on May 29, 2009.

(51) Int. Cl.
*C01B 7/01* (2006.01)
*H01M 6/50* (2006.01)
*H01M 6/04* (2006.01)

(52) U.S. Cl.
USPC ............ 204/157.48; 204/157.52; 429/49; 429/200

(58) Field of Classification Search
USPC ............ 204/157.52, 157.44, 157.48, 157.41; 423/487

See application file for complete search history.

(56) References Cited

U.S. PATENT DOCUMENTS

| | | | |
|---|---|---|---|
| 3,201,337 A * | 8/1965 | Eichelberger et al. | ..... 204/157.3 |
| 3,540,934 A | 11/1970 | Boeke | |
| 3,996,064 A | 12/1976 | Thaller | |
| 4,133,941 A | 1/1979 | Sheibley | |
| 4,159,366 A | 6/1979 | Thaller | |
| 4,226,112 A | 10/1980 | Jibelian | |

(Continued)

FOREIGN PATENT DOCUMENTS

| | | |
|---|---|---|
| DE | 102006007206 | 10/2006 |
| EP | 0342901 | 11/1989 |

(Continued)

OTHER PUBLICATIONS

Peter Atkins, Physical Chemistry, $5^{th}$ ed., pp. 30-33 (1994).*

(Continued)

*Primary Examiner* — Keith Hendricks
*Assistant Examiner* — Colleen M Raphael
(74) *Attorney, Agent, or Firm* — Haynes and Boone LLP

(57) ABSTRACT

A method of producing HCl from $H_2$ and $Cl_2$ is provided. In some embodiments, the method comprises at least one photochemical chamber placed in fluid communication with at least one source of $H_2$ and at least one source of $Cl_2$. In some embodiments, the photochemical chamber effects the formation of HCl through the use of at least one source of ultraviolet radiation contained therein. In some embodiments, the HCl product may be captured and used as a gas. In some embodiments, the HCl product may be absorbed into water to form an aqueous HCl solution.

14 Claims, 10 Drawing Sheets

(56) References Cited

U.S. PATENT DOCUMENTS

| | | |
|---|---|---|
| 4,309,372 A | 1/1982 | Sheibley |
| 4,312,735 A | 1/1982 | Grimes et al. |
| 4,370,392 A | 1/1983 | Savinell et al. |
| 4,381,978 A | 5/1983 | Gratzel et al. |
| 4,414,090 A | 11/1983 | D'Agostino et al. |
| 4,423,121 A | 12/1983 | Hammond et al. |
| 4,454,649 A | 6/1984 | Jalan et al. |
| 4,468,441 A | 8/1984 | D'Agostino et al. |
| 4,470,298 A | 9/1984 | Jibelian |
| 4,485,154 A | 11/1984 | Remick et al. |
| 4,496,637 A | 1/1985 | Shimada et al. |
| 4,517,261 A | 5/1985 | Whittlesey |
| 4,543,302 A | 9/1985 | Gahn et al. |
| 4,576,878 A | 3/1986 | Gahn |
| 4,732,827 A | 3/1988 | Kaneko et al. |
| 4,784,924 A | 11/1988 | Savinell et al. |
| 4,814,241 A | 3/1989 | Nagashima et al. |
| 4,828,666 A | 5/1989 | Iizuka et al. |
| 4,874,483 A | 10/1989 | Wakabayashi et al. |
| 4,882,241 A | 11/1989 | Heinzel |
| 4,891,629 A | 1/1990 | Gajjar et al. |
| 4,894,294 A | 1/1990 | Ashizawa et al. |
| 4,929,325 A | 5/1990 | Bowen et al. |
| 4,945,019 A | 7/1990 | Bowen et al. |
| 4,948,681 A | 8/1990 | Zagrodnik et al. |
| 4,956,244 A | 9/1990 | Shimizu et al. |
| 5,022,970 A * | 6/1991 | Cook et al. ............... 429/111 |
| 5,061,578 A | 10/1991 | Kozuma et al. |
| 5,162,168 A | 11/1992 | Downing et al. |
| 5,188,911 A | 2/1993 | Downing et al. |
| 5,236,562 A * | 8/1993 | Okumura et al. ....... 204/157.44 |
| 5,258,241 A | 11/1993 | Ledjeff et al. |
| 5,366,824 A | 11/1994 | Nozaki et al. |
| 5,648,184 A | 7/1997 | Inoue et al. |
| 5,656,390 A | 8/1997 | Kageyama et al. |
| 5,665,212 A | 9/1997 | Zhong et al. |
| 5,733,506 A * | 3/1998 | Silver et al. ............... 73/23.2 |
| 5,759,711 A | 6/1998 | Miyabayashi et al. |
| 5,851,694 A | 12/1998 | Miyabayashi et al. |
| 6,005,183 A | 12/1999 | Akai et al. |
| 6,040,075 A | 3/2000 | Adcock et al. |
| 6,086,643 A | 7/2000 | Clark et al. |
| 6,461,772 B1 | 10/2002 | Miyake et al. |
| 6,475,661 B1 | 11/2002 | Pellegri et al. |
| 6,509,119 B1 | 1/2003 | Kobayashi et al. |
| 6,524,452 B1 | 2/2003 | Clark et al. |
| 6,555,267 B1 | 4/2003 | Broman et al. |
| 6,562,514 B1 | 5/2003 | Kazacos et al. |
| 6,688,159 B1 * | 2/2004 | Grunewald ............... 73/25.03 |
| 6,692,862 B1 | 2/2004 | Zocchi |
| 6,720,107 B1 | 4/2004 | Holtom et al. |
| 6,759,158 B2 | 7/2004 | Tomazic |
| 6,761,945 B1 | 7/2004 | Adachi et al. |
| 6,764,789 B1 | 7/2004 | Sekiguchi et al. |
| 6,905,797 B2 | 6/2005 | Broman et al. |
| 6,986,966 B2 | 1/2006 | Clarke et al. |
| 7,061,205 B2 | 6/2006 | Shigematsu et al. |
| 7,078,123 B2 | 7/2006 | Kazacos et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 7,704,301 B2 * | 4/2010 | Zhou et al. ............... 73/23.2 |
| 2003/0008203 A1 | 1/2003 | Winter |
| 2004/0170893 A1 | 9/2004 | Nakaishi et al. |
| 2004/0202915 A1 | 10/2004 | Nakaishi et al. |
| 2004/0234843 A1 | 11/2004 | Skyllas-Kazacos |
| 2004/0241544 A1 | 12/2004 | Nakaishi et al. |
| 2005/0034997 A1 | 2/2005 | Dimascio et al. |
| 2005/0074653 A1 | 4/2005 | Broman et al. |
| 2005/0156431 A1 | 7/2005 | Hennessy |
| 2005/0156432 A1 | 7/2005 | Hennessy |
| 2005/0158615 A1 | 7/2005 | Samuel et al. |
| 2005/0164075 A1 | 7/2005 | Kumamoto et al. |
| 2005/0181273 A1 | 8/2005 | Deguchi et al. |
| 2005/0260473 A1 | 11/2005 | Wang |
| 2007/0072067 A1 | 3/2007 | Symons et al. |
| 2007/0080666 A1 | 4/2007 | Ritter et al. |
| 2007/0111089 A1 | 5/2007 | Swan |
| 2008/0029404 A1 | 2/2008 | Weber et al. |
| 2008/0081247 A1 | 4/2008 | Nakaishi et al. |
| 2008/0193828 A1 | 8/2008 | Sahu |
| 2009/0218984 A1 | 9/2009 | Parakulam |
| 2010/0003586 A1 | 1/2010 | Sahu |
| 2010/0090651 A1 | 4/2010 | Sahu |
| 2010/0092757 A1 | 4/2010 | Nair |
| 2010/0092807 A1 | 4/2010 | Sahu |
| 2010/0092813 A1 | 4/2010 | Sahu |
| 2010/0092843 A1 | 4/2010 | Conway |
| 2010/0094468 A1 | 4/2010 | Sahu |
| 2010/0136455 A1 | 6/2010 | Winter |
| 2010/0143781 A1 | 6/2010 | Keshavarz |
| 2011/0074357 A1 | 3/2011 | Parakulam et al. |
| 2011/0079074 A1 * | 4/2011 | Sahu ........................ 73/25.03 |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 03005476 | 1/2003 |
| WO | 2004079849 | 9/2004 |
| WO | 2006135958 | 12/2006 |

OTHER PUBLICATIONS

International Search Report/Written Opinion for related PCT Application No. PCT/US2010/036769, date of mailing Dec. 29, 2010.
Office Action for U.S. Appl. No. 12/217,059 mailed Aug. 23, 2010.
Search Report for PCT Application No. PCT/US2009/049285.
Office Action for U.S. Appl. No. 12/577,137 mailed Sep. 7, 2010.
Moraw, Franz Christian "Hybrid PEM Fuel Cell: Redox Cathode Approach," *A Thesis for the Degree of Master of Applied Science in the University of BC*, 2009, 159 pages.

* cited by examiner

US 8,551,299 B2

METHODS OF PRODUCING HYDROCHLORIC ACID FROM HYDROGEN GAS AND CHLORINE GAS

PRIORITY CLAIM

This application claims the benefit of U.S. Provisional Application No. 61/182,335 entitled "METHODS OF PRODUCING HYDROCHLORIC ACID FROM HYDROGEN GAS AND CHLORINE GAS" filed on May 29, 2009.

BACKGROUND OF THE INVENTION

1. Field of the Invention

The present disclosure relates to methods for preparing hydrochloric acid from hydrogen gas and chlorine gas.

2. Description of the Relevant Art

Chorine gas and caustics such as alkali metal hydroxides are typically produced in a commercial setting through the electrolysis of, for example, alkali metal halides. For example, caustics such as sodium hydroxide and potassium hydroxide may be produced on a commercial scale through the electrolysis of sodium chloride and potassium chloride, respectively. In diaphragm cells that utilize semi-permeable cation exchange membranes, aqueous sodium chloride may be provided to the area of the anode, which is separated by the membrane from a cathode. As sodium ions cross the membrane, the chloride ions oxidize at the anode to form chlorine gas, and water is reduced at the anode to form hydrogen and hydroxide ions. While the hydrogen ions combine to form hydrogen gas, the hydroxide ions and sodium ions combine to form NaOH, resulting in the net production of a NaOH solution, $H_2$, and $Cl_2$.

Although the commercial production described above typically results in caustic solutions that are suitable for direct use, $H_2$ and $Cl_2$ byproducts present certain challenges in terms of disposal, particularly given the reactive nature of those byproducts. In some instances, $H_2$ and $Cl_2$ may be recombined to form HCl, which can be used as a gas or absorbed into water to form an aqueous solution. However, the high temperatures and pressures typically associated with the processing of $H_2$ and $Cl_2$ can yield highly unstable conditions that result in the combustion and/or explosion of the reactants.

Therefore, there exists a need to develop methods that safely and effectively removes the $H_2$ and $Cl_2$ gases from certain commercial processes, or in the alternative, combines $H_2$ and $Cl_2$ to form HCl for other industrial applications.

SUMMARY OF THE INVENTION

In an embodiment, a method of preparing HCl from $H_2$ and $Cl_2$ is provided. In some embodiments, the method includes placing at least one photochemical chamber in fluid communication with at least one source of $H_2$ and at least one source of $Cl_2$. In some embodiments, the photochemical chamber includes at least one source of ultraviolet radiation. In some embodiments, the activation of the at least one source of ultraviolet radiation affects the formation of HCl from $H_2$ and $Cl_2$. In some embodiments, the HCl product may be captured and used as a gas. In some embodiments, the HCl product can be absorbed into water to form an aqueous HCl solution.

In an embodiment, a method of producing hydrogen chloride includes collecting chlorine gas from a redox flow cell battery system. Hydrogen and the collected chlorine gas are introduced into at least one photochemical chamber containing at least one source of ultraviolet radiation. The source(s) of ultraviolet radiation are activated, thereby exposing the hydrogen and the chlorine to ultraviolet radiation to produce hydrogen chloride. The produced hydrogen chloride is collected or mixed with water to form a hydrochloric acid solution. At least one sensor may be used to monitor the ratio of the concentration of hydrogen to chlorine in the chamber.

In another embodiment, a method of producing hydrogen chloride includes collecting hydrogen gas from redox flow cell battery system. Chlorine gas and the collected hydrogen gas are introduced into at least one photochemical chamber containing at least one source of ultraviolet radiation. The source(s) of ultraviolet radiation are activated, thereby exposing the hydrogen and the chlorine to ultraviolet radiation to produce hydrogen chloride. The produced hydrogen chloride is collected or mixed with water to form a hydrochloric acid solution.

In an alternate embodiment, a method of producing hydrogen chloride includes collecting hydrogen gas and chlorine gas from redox flow cell battery system. Chlorine gas and the collected hydrogen gas are introduced into at least one photochemical chamber containing at least one source of ultraviolet radiation. The source(s) of ultraviolet radiation are activated, thereby exposing the hydrogen and the chlorine to ultraviolet radiation to produce hydrogen chloride. The produced hydrogen chloride is collected or mixed with water to form a hydrochloric acid solution.

In an embodiment, a redox flow cell battery system includes a redox flow cell that includes a pair of electrodes disposed in separate half-cell compartments; a porous or ion-selective membrane separating the half-cell compartments; and an electrolyte that is flowed through the half-cell compartments, wherein the electrolyte includes chromium ions and iron ions. A chamber, including an ultraviolet light source, is coupled to one or both half-cell compartments, wherein during operation of the flow battery system the chamber collects hydrogen and/or chlorine gas from one or both half-cell compartments, and/or a rebalance compartment and produces hydrogen chloride from the collected gas.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
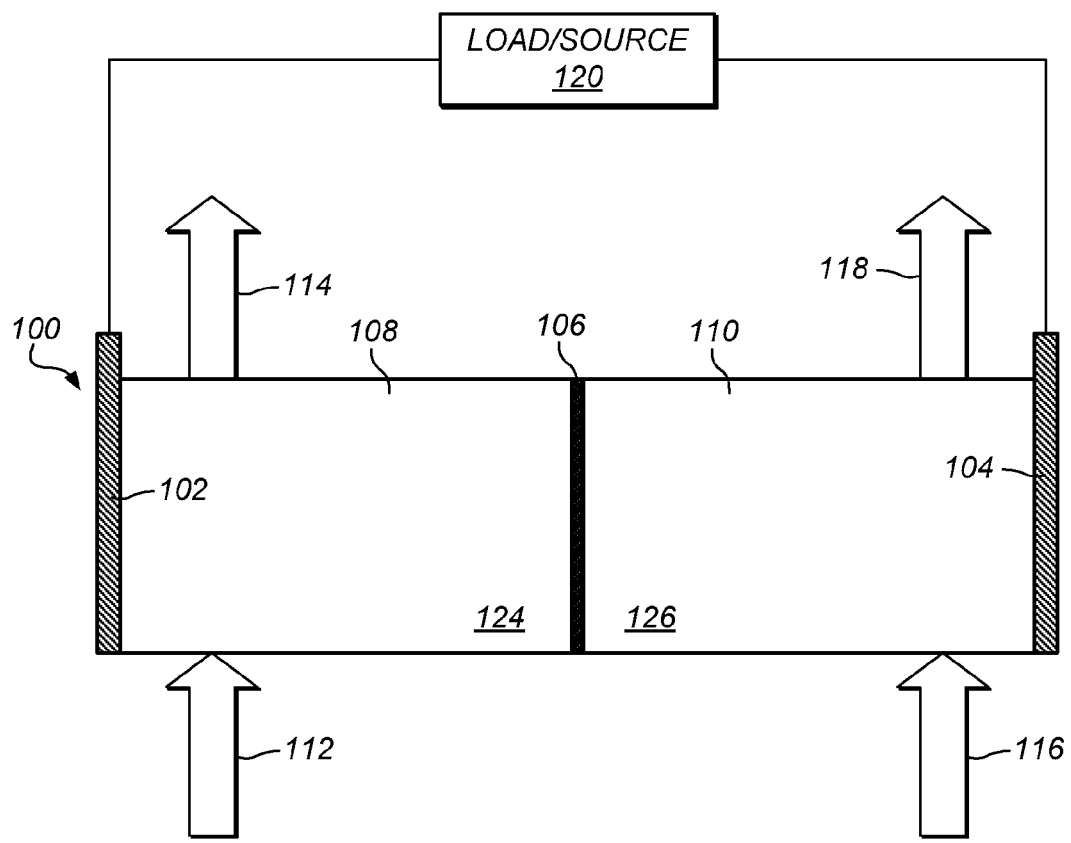
FIG. 1 illustrates a photochemical chamber.

Where possible in the figures, elements having the same function have the same designation. While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

As used in the present specification, the following words and phrases are generally intended to have the meanings as set forth below, except to the extent that the context in which they are used indicates otherwise.

As described herein, the term "fluid communication" refers to structures which are in contact with, but not necessarily affixed to, one another, whereby a fluid or gas can pass from one structure to the other. For example, two structures may be in fluid communication with one another by a channel, conduit, opening, and/or valve, even if the communication includes a valve in a closed state but provided that the valve can be opened, whereby a fluid or gas can be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

FIG. 1 illustrates a flow battery system 100 according to some of the embodiments described herein. As shown, flow battery system 100 includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104 respectively, in contact with electrolytes 124 and 126, respectively, such that an anodic reaction occurs at the surface of one of electrodes 102 or 104 and a cathodic reaction occurs at the surface of the other one of electrodes 102 or 104. In some embodiments, multiple flow battery systems 100 can be electrically coupled (e.g., stacked) either in series to achieve higher voltage or in parallel in order to achieve higher current. As shown in FIG. 1, electrodes 102 and 104 are coupled across load/source 120, through which electrolytes 124 and 126 are either charged or discharged. The operation of a flow cell and the composition of a membrane is further described in U.S. patent application Ser. No. 12/217,059, entitled "Redox Flow Cell," filed on Jul. 1, 2008, which is incorporated herein by reference. Construction of a flow cell stack is described in U.S. patent application Ser. No. 12/577,134, entitled "Common Module Stack Component Design" filed on Oct. 9, 2009, which is incorporated herein by reference.

When filled with electrolyte, one half-cell (e.g., 108 or 110) of flow battery system 100 contains anolyte 126 and the other half-cell contains catholyte 124, the anolyte and catholyte being collectively referred to as electrolytes. Reactant electrolytes may be stored in separate tanks and dispensed into the cells 108 and 110 via conduits coupled to cell inlet/outlet (I/O) ports 112, 114 and 116, 118 respectively, often using an external pumping system. Therefore, electrolyte 124 flows into half-cell 108 through inlet port 112 and out through outlet port 114 while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Examples of electrodes 102 and 104 are also described in U.S. patent application Ser. No. 12/576,235, entitled "Magnetic Current Collector" filed on Oct. 8, 2009, which is incorporated herein by reference. Flow battery system 100 operates by changing the oxidation state of its constituents during charging or discharging. The two half-cells 108 and 110 are connected in series by the conductive electrolytes, one for anodic reaction and the other for cathodic reaction. In operation (i.e., charge or discharge), electrolytes 126 and 124 (i.e., anolyte or catholyte) are flowed through half-cells 108 and 110 through I/O ports 112, 114 and 116, 118 respectively as the redox reaction takes place. Power is provided to a load 120 or received from power source 120, depending on if the flow cell battery is in discharging or charging mode, respectively.

In one embodiment, a redox flow cell battery system is based on a Cr/Fe redox pair. The remainder of the description will be based on a Cr/Fe redox flow cell battery, however, it should be understood that the concepts described herein may also be applied to other metals. In an embodiment of a Cr/Fe redox flow cell battery, both electrolytes 124 and 126 include a solution of $FeCl_2$ and $CrCl_3$ in aqueous HCl.

In some embodiments, the redox pairs of the a Cr/Fe redox flow cell battery include $Cr^{3+}/Cr^{2+}$ and $Fe^{3+}/Fe^{2+}$, respectively. Electrical energy is converted during charging into chemical energy through electrochemical reactions. The process is reversed on discharging. Those processes are reflected by the following:

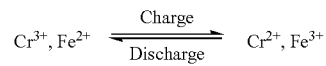

Anode: typically where oxidation occurs, in this case during discharge $Cr^{2+}$ oxidizes to $Cr^{3+}$. Cathode: typically where reduction occurs, in this case during discharge $Fe^{3+}$ reduces to $Fe^{2+}$. In cell 100 shown in FIG. 1A, electrolytes 124 and 126 may undergo the following reactions:

Charging:

$$FeCl_2+Cl^- \rightarrow FeCl_3+e^- \qquad \text{Iron side:}$$

$$CrCl_3+e^- \rightarrow CrCl_2+Cl^- \qquad \text{Chromium side:}$$

Discharging:

$$FeCl_3+e^- \rightarrow FeCl_2+Cl^- \qquad \text{Iron side:}$$

$$CrCl_2+Cl^- \rightarrow CrCl_3+e^- \qquad \text{Chromium side:}$$

In this case, the $Cl^-$ ion (and $H^+$ generated in parasitic reactions) pass through membrane 106 and the electron $e^-$ flows through load/source 120.

The oxidation-reduction of the iron takes place at cathode 102, and that of chromium at anode 104. For this reason, acidic solutions are used for electrolytes 124 and 126, such as hydrochloric acid solutions containing iron chloride and chromium chloride.

In certain embodiments, catholyte 124 includes an aqueous solution of hydrochloric acid and $FeCl_2$, while anolyte 126 comprises an aqueous solution of hydrochloric acid and CrCl₃. In some embodiments, catholyte 124 may also include CrCl₃ and anolyte 126 may include FeCl₂ so that electrolyte 126 and electrolyte 124, upon being fully discharged, are the same electrolytic solutions.

Therefore, as discussed above, when source 120 supplies an appropriate positive voltage on cathode terminal 102 with respect to anode terminal 104, thereby charging the electrolytes in redox flow cell 100, the following reaction takes place:

$$Fe^{2+} \rightarrow Fe^{3+} + e^-$$ Iron side:

$$Cr^{3+} + e^- \rightarrow Cr^{2+}$$ Chromium side:

Applying the external power to charge the redox flow cell affects an electron transfer, while a Cl⁻ ion crosses membrane 106 from anodic half-cell 110 to cathodic half cell 108 and/or H+ ions cross the membrane 106 from cathodic half-cell 108 to anodic half-cell 110. In an ideal solution, the fully charged redox flow cell is composed of a 100% FeCl₃ solution in cathodic half-cell 108 and 100% CrCl₂ in half-cell 110 on the anode side.

When the external power supply is replaced with a load, the redox flow cell begins to discharge and the opposite redox reactions take place:

$$Fe^{3+} + e^- \rightarrow Fe^{2+}$$ Iron side:

$$Cr^{2+} \rightarrow Cr^{3+} + e^-$$ Chromium side:

A fully discharged redox flow cell is, therefore, composed of a 100% FeCl₂ solution in catholyte 124, and a 100% active CrCl₃ solution in anolyte 126.

Certain parasitic reactions, however, also take place during the charge/discharge cycling of electrolytes 124 and 126, especially in the presence of impurities such as nickel that often accompany the iron chloride and chromium chloride salts. In particular, the production of hydrogen gas from H⁺ in the aqueous acid solution of anolyte 126 competes with the anodic reduction of Cr³⁺, resulting in the following parasitic reactions:

$$2H^+ + 2e^- \rightarrow H_2$$

$$Cr^{2+} + H^+ \rightarrow Cr^{3+} + \frac{1}{2}H_2$$

Typically, a marked difference between the state of charge of anolyte 126 and catholyte 124 develops over repeated cycles of charge and discharge. That is, while the cathodic conversion of Fe²⁺ to Fe³⁺ typically occurs at about 100% during a charge cycle, the anodic reduction of Cr³⁺ to Cr²⁺ occurs with less efficiency, depending on the purity of the electrolyte solution. In some cases, as exemplified here, 98% of the Cr³⁺ can be reduced to Cr²⁺:

$$Fe^{2+} \rightarrow Fe^{3+} + e^- (100\%)$$ Iron side:

$$Cr^{3+} + e^- \rightarrow Cr^{2+} (98\%)$$ Chromium side:

$$2H^+ + 2e^- \rightarrow H_2 (2\%)$$

During a subsequent discharge cycle Fe³⁺ is converted to Fe²⁺ by addition of an electron from Cr²⁺. During the discharge cycle, the conversion of Fe³⁺ to Fe²⁺ is therefore limited by the availability of Cr²⁺ for conversion. Since only 98% of the Cr³⁺ initially present is converted to Cr²⁺ during charging, less than the full amount of Fe³⁺ is converted to Fe²⁺ during the discharge cycle. This reduction of charge capacity is carried on with each subsequent cycle, gradually reducing the charge capacity of the redox flow cell.

A rebalance system as described herein can be utilized to substantially restore the parity between the active iron components in catholyte 124 and the active chromium components in anolyte 126. In one embodiment, the restoration of parity between iron and chromium ions may be accomplished by placing the redox flow cell in fluid communication with a rebalance system including at least one electrochemical cell and at least one photochemical cell. The restoration of the charge ratio and acidic concentration of the electrolyte compositions may be effected, for example, through the reduction of Fe³⁺ ions, since a further reduction of Cr³⁺ ions will result in a lower current yield. The electrochemical reduction of Fe³⁺ results in the formation of Cl₂ gas in the rebalance cell. However, the formation of Cl₂ in the rebalance cell, coupled with the parasitic formation of H₂ that may take place at the anode of the redox cell, can potentially yield volumes of H₂ and Cl₂ gases. Given the hazards typically associated with H₂ and Cl₂ gases, the H₂ and Cl₂ gases may be removed to a separate reaction chamber for processing. Alternatively, it may be desirable to recycle those gases by converting them into HCl and using the formed HCl to restore acidity to the electrolyte solutions. Therefore, in some embodiments, the rebalance systems described herein will effect the removal of the H₂ and Cl₂ gases from the system and will recombine H₂ and Cl₂ to replenish the supply of HCl in the electrolytes, all while rebalancing the active ion ratios of anolyte 126 and catholyte 124.

Figure 2:
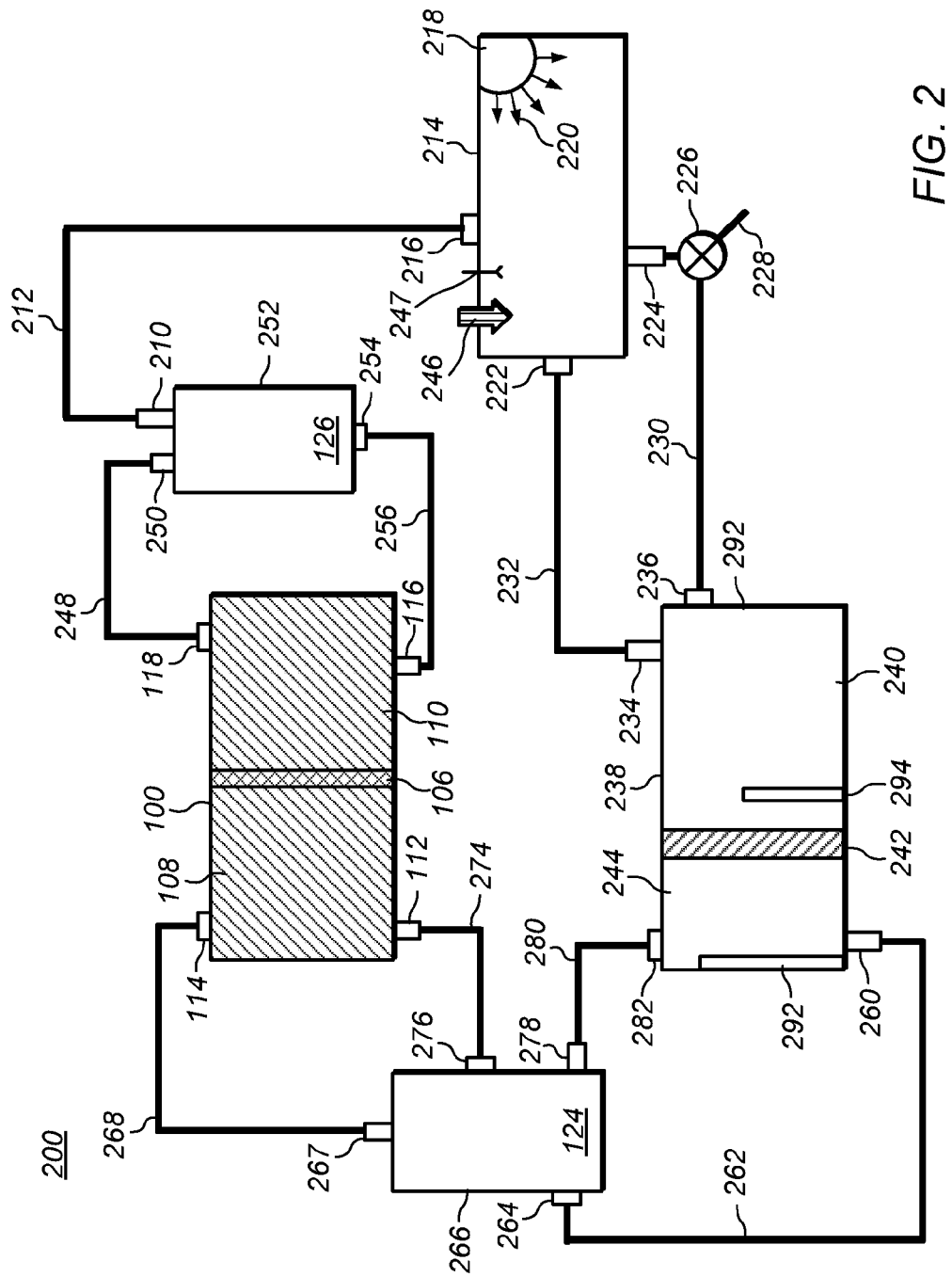
FIG. 2 depicts a redox flow cell coupled to a rebalancing system.

FIG. 2 illustrates a redox flow cell battery system 200. Redox flow cell battery system 200 includes redox flow cell 100, an electrochemical rebalance cell 238, and a photochemical cell 214. Redox cell battery 100 is shown with cathode compartment 108 and anode compartment 110, which are separated by membrane 106, as illustrated in FIG. 1. Electrochemical rebalance cell 238 and photochemical cell 214 form the rebalance system. H₂ produced in anode compartment 110 may be transferred from redox cell 100 through conduit 248 and into anolyte reservoir 252, which also contains anolyte 126. From there, H₂ may be vented from outlet 210 to photochemical cell 214 of the rebalance system. Vented H₂ may be carried along conduit 212 and into photochemical cell 214 via inlet 216. Electrochemical cell 238 includes anode compartment 244 and cathode compartment 240. Disposed therein are anode 294 and cathode 292. Suitable anode and cathode materials are further described below with respect to FIG. 3.

As discussed above, the 1:1 charge ratio of the anolyte and catholyte solutions in certain redox cells may be restored through the reduction of Fe³⁺ ions. Electrochemical rebalance cell 238 allows the reduction of Fe³⁺ to Fe²⁺ to be performed to restore the charge balance. Applying power to the electrodes of electrochemical rebalance cell 238 affects the reduction of Fe³⁺ to Fe²⁺ to restore the system charge balance. The reduction of Fe³⁺ ions can take place in different ways. For example, the reduction of Fe³⁺ ions may take place at cathode 292 of electrochemical rebalance cell 238 through the electrochemical generation of Cl₂ at anode 294:

$$Cl^- \rightarrow \frac{1}{2}Cl_2 + e^-$$

$$Fe^{3+} + e^- \rightarrow Fe^{2+}$$

Cl₂ produced at anode 294 may be vented from electrochemical cell 238 through outlet 234. The vented Cl₂ may then be transported along conduit 232 and into photochemical cell 214 via inlet 222. In some embodiments, photochemical cell 214 houses ultraviolet source 218. Ultraviolet source 218 may be encapsulated by a shell to protect it from exposure to substances (e.g., Cl₂ and H₂) within photochemical cell 214. In some embodiments, the shell may be composed of quartz, glass, or a polymeric material capable of transmitting ultraviolet light at wavelengths sufficient to promote the reaction of $H_2$ and $Cl_2$ to form HCl. In some embodiments, ultraviolet source 218 may placed outside of photochemical cell 214, wherein ultraviolet source 218 is separated from the inside of photochemical cell 214 by a window. In some embodiments, the window is composed of quartz. In some embodiments, photochemical source 218 produces ultraviolet radiation 220, which may be used to effectively convert $H_2$ and $Cl_2$ present in photochemical cell 214 into HCl in the following manner:

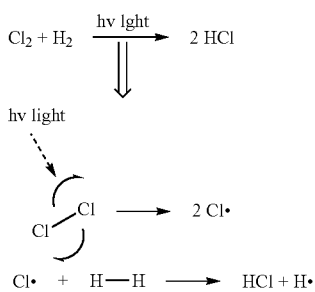

The HCl product formed in photochemical cell 214 may then be drained through outlet 224. Some embodiments may include a valve 226 that can be used to drain HCl out of rebalance system 200 via conduit 228. Alternatively, the HCl product of photochemical cell 214 may be directed through conduit 230 and into anode compartment 240 of electrochemical cell 238 via inlet 236.

An advantage of the use of a photochemical cell is the ability of the system to retain the $Cl_2$ lost during rebalancing of the charge ratio. If the $Cl_2$ was simply vented, the acidity of the electrolyte solutions would become reduced, which would alter the operating characteristics of the flow cell battery system. Use of a photochemical cell to regenerate HCl allows the acidity to be maintained by reintroducing acid that would have been lost during a rebalancing procedure.

In some embodiments, suitable sources of ultraviolet radiation may include sources that emit light having a wavelength from about 100 nm to about 450 nm. In some embodiments, ultraviolet radiation source 218 will emit light having a wavelength of about 370 nm to about 430 nm. In some embodiments, ultraviolet radiation source 218 emits light having a wavelength of about 390 nm to about 410 nm.

The temperature and pressure resulting from the operation of ultraviolet source 218 may be closely monitored by sensors 246. Sensors 246 may, for example, include temperature sensors of any type, such as thermocouples, thermistors, or any other device for measuring temperature. Sensors 246 may also include pressure sensors. In some embodiments, it may be desirable to keep the temperature below 200° C. during the conversion of $Cl_2$ and $H_2$. If a high temperature condition exists, battery system 200 may take action to lower the temperature.

HCl introduced into electrochemical cell 238 will dissociate into $H^+$ and $Cl^-$ in aqueous anolyte contained in anode compartment 240. Selectively-permeable membrane 242 may allow the transport of $H^+$ from anode compartment 240 into cathode compartment 244. Suitable materials for membrane 242 include those described below with respect to FIG. 3. The flow of $H^+$ into cathode compartment 244 will raise the catholyte level and decrease the concentration of the components of the catholyte. Catholyte levels and concentrations may be equilibrated by catholyte reservoir 266. Diluted catholyte may be drained from cathode compartment 244 through outlet 260. The diluted catholyte is transported along conduit 262 and into catholyte reservoir 266 via inlet 264. There, the diluted catholyte may be equilibrated and again dispelled via outlet 278. The equilibrated catholyte is then transported through conduit 280 and reintroduced into cathode compartment 244 via inlet 282.

Catholyte in cathode compartment 108 of redox cell 100 may be drained through outlet 112 and replenished in catholyte reservoir 266 via conduit 274 and inlet 276. Replenished catholyte 124 exits catholyte reservoir 266 though outlet 267, which is then transported through conduit 268 and reintroduced into cathode compartment 108 via inlet 114. Similarly, anolyte reservoir 252 feeds fresh anolyte from outlet 250 into anode compartment 110 via conduit 248 and inlet 118. Once depleted, the anolyte may be drained from anode compartment 110 through outlet 116 and transported along conduit 256 for reintroduction into anolyte reservoir 252 via inlet 254.

Alternatively, in some embodiments, the rebalance system may include a single rebalance cell where photochemical cell 214 is combined with anode compartment 240 of electrochemical rebalance cell 238, as described with respect to FIGS. 3 and 4 below. In some embodiments, the electrochemical rebalance cell may reflect the combination of an electrochemical cell and a photochemical cell, by incorporating at least one source of ultraviolet radiation in the electrochemical rebalance cell.

Figure 3:
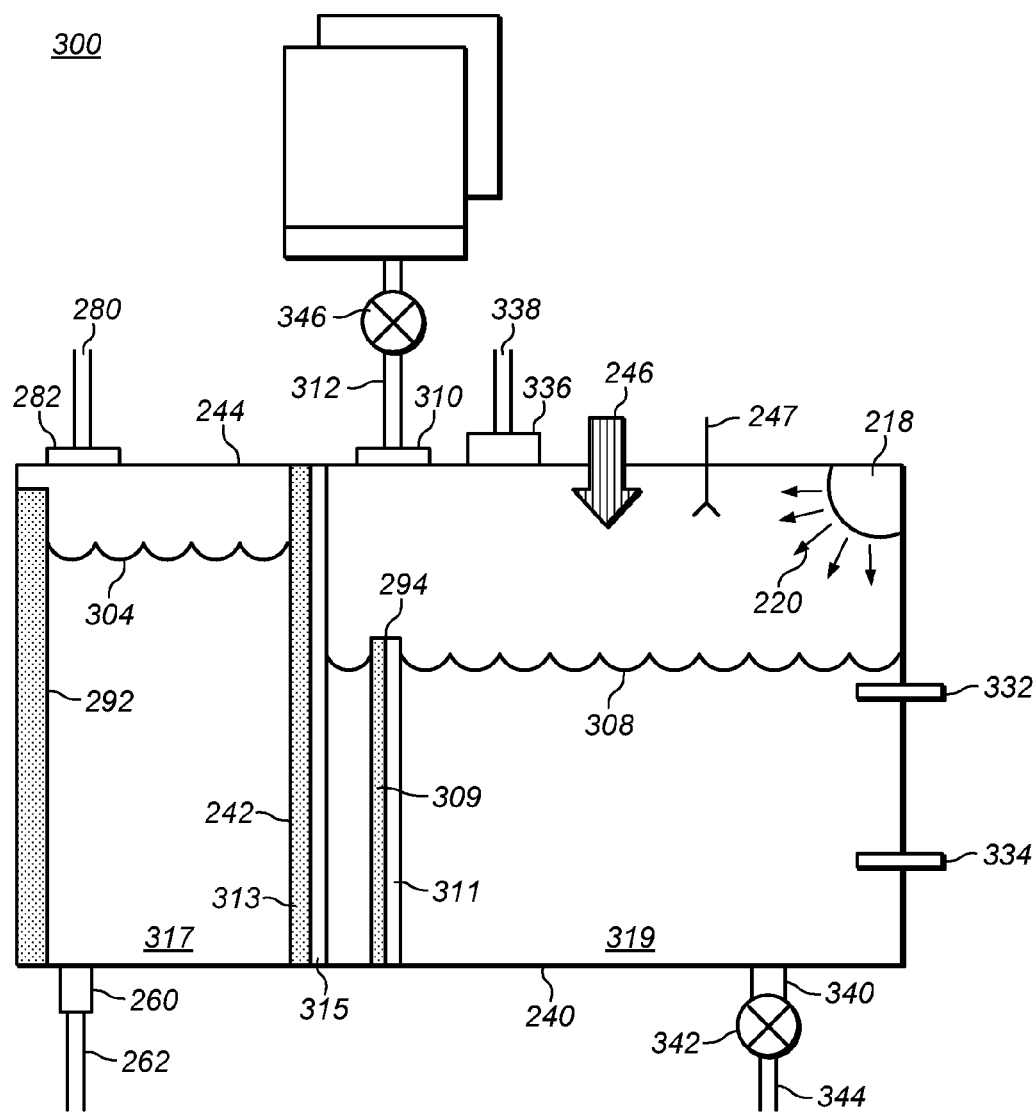
FIG. 3 depicts an embodiment of a rebalance cell.

FIG. 3 illustrates a combined rebalance cell where the anode compartment of an electrochemical rebalance cell also serves as the photochemical cell of the combined rebalance cell. Combined rebalance cell 300 includes cathode compartment 244 and anode compartment 240, which are separated by porous membrane 242. In some embodiments, porous membrane 242 comprises porous layer 313 and ion-selective layer 315. In some embodiments, membrane 242 may be selectively permeable for certain species.

Membrane 242 may be selected specifically to resist substantial degradation by aqueous $Cl_2$. In some embodiments, membrane 242 may comprise a polymeric base. Exemplary polymeric bases may include, but are not limited to, bases comprising polyethylene. In some embodiments, ion-selective layer 315 may comprise a polyfluorinated layer or a perfluorinated layer. In certain embodiments, ion-selective layer 315 may be selectively permeable to certain ionic species, such as H. Exemplary layers may include, but are not limited to, perfluorinated materials. In some embodiments, the perfluorinated materials may include one or more units having the following structure:

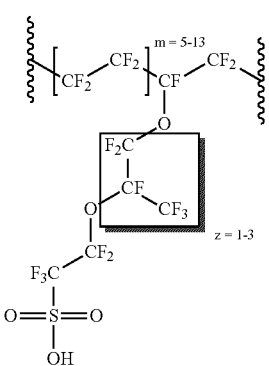

In some embodiments, ion-selective layer 315 may comprise a sulfonated tetrafluoroethylene based fluoropolymer-copolymer such as Nafion®, manufactured by E.I. duPont de Nemours and Company of Wilmington, Del. In some embodiments, ionselective layer 315 may be further reinforced by a chemically-resistant material such as Teflon®.

Anode compartment 240 contains anode 294, while cathode compartment 244 contains cathode 292. In some embodiments, anode 294 may include a mixed metal oxide layer 309 disposed on metal substrate layer 311. In certain embodiments, anode 294 may include a mixed metal oxide without substrate layer 311. Anode 294 may be selected to resist substantial degradation from exposure to aqueous $Cl_2$. In some embodiments, anode 294 comprises a carbon or mixed-metal oxide disposed on a substrate. In some embodiments, the mixed metal oxide comprises ruthenium and titanium oxide. In some embodiments, the mixed metal oxide comprises iridium and ruthenium oxide. In some embodiments, the substrate is selected from titanium and titanium oxide. In some embodiments, the carbon or mixed-metal oxide may be disposed on the substrate in such a manner that allows at least some of the substrate to remain exposed after deposition of the carbon or metal oxide. In some embodiments, the carbon or mixed metal oxide and the substrate will form two separate and distinct layers.

Anode compartment 240 further holds electrolyte 319, the volume of which is indicated by electrolyte level 308. Space 314 defines the area between electrolyte level 308 and the top of anode compartment 240. When electrolyte 319 includes aqueous HCl, powering cell 300 will effect the formation of $Cl_2$ at anode 294, which then collects in space 314. $H_2$ from an external source (e.g., anolyte reservoir 252, FIG. 2) is also introduced into space 314 via conduit 338 and inlet 336. Anode compartment 240 further contains ultraviolet source 218, which may be used to expose space 314 to ultraviolet radiation 220. Ultraviolet source 218 may be encapsulated by a shell to protect it from exposure to substances (e.g., $Cl_2$ and $H_2$) within space 314. In some embodiments, the shell may be composed of quartz, glass, or a polymeric material capable of transmitting ultraviolet light at wavelengths sufficient to promote the reaction of $H_2$ and $Cl_2$ to form HCl. In some embodiments, ultraviolet source 218 may placed outside of anode compartment 240, wherein ultraviolet source 218 is separated from space 314 by a window. In some embodiments, the window is composed of quartz, glass, or a polymeric material capable of transmitting ultraviolet light at wavelengths sufficient to promote the reaction of $H_2$ and $Cl_2$ to form HCl. The exposure of $H_2$ and $Cl_2$ to ultraviolet radiation 220 effects the formation of HCl, which then dissociates in aqueous anolyte 319 as HCl. The heat and pressure resulting from the operation of ultraviolet source 218 may be closely monitored by sensors 246. In some embodiments, the anode compartment further includes a $Cl_2/H_2$ sensor 247 disposed therein to monitor the concentrations of $Cl_2$ and $H_2$ present in the rebalance cell.

In some embodiments, a $Cl_2/H_2$ sensor 247 may be disposed in photochemical cell 214 to monitor the concentrations of $Cl_2$ and $H_2$ present in the rebalance cell. Ideally, to safely control the reaction that occurs in photochemical cell 214, a chlorine rich environment is desired. In some embodiments, a chlorine/hydrogen concentration ratio may approach 2:1. However, an excessive amount of chlorine is also undesirable and therefore some embodiments may limit the amount of chlorine in the gas mixture. Sensor 247 can be utilized to monitor the concentration ratio of chlorine to hydrogen.

Figure 6:
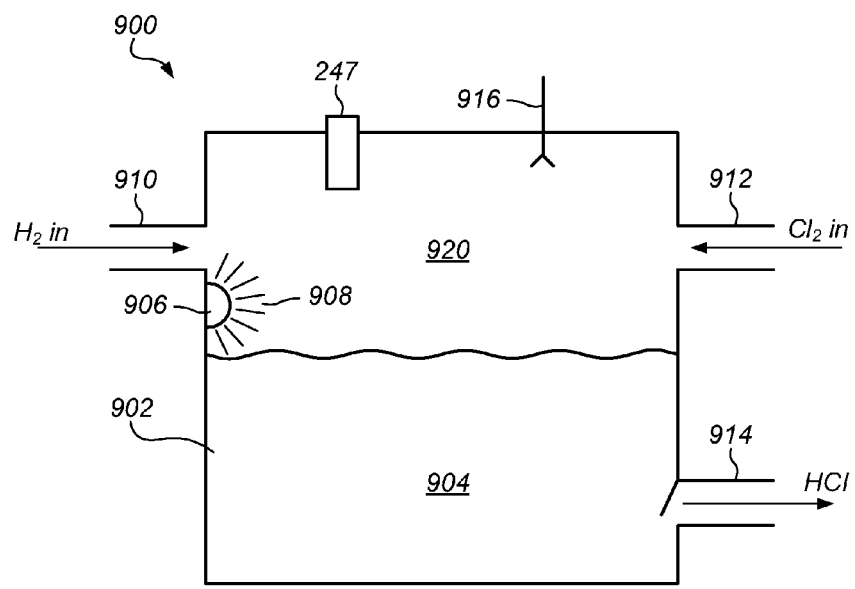
FIG. 6 depicts a gas concentration monitoring system.

FIG. 6 illustrates an exemplary system 900 that includes a gas monitoring system to measure the relative concentrations of a gaseous mixture. System 900 may be a portion of a combination rebalance cell or a photochemical cell that is used to produce HCl from a mixture of $H_2$ and $Cl_2$.

As shown in FIG. 6, system 900 includes a compartment 902 coupled to receive various substances into a space 920 from inlets 920 and 912. For example, in some embodiments, compartment 902 may receive $H_2$ gas via inlet 910 and $Cl_2$ gas via inlet 912. Compartment 902 may also include an ultraviolet source 906, which may be used to expose space 920 to ultraviolet radiation 908. The exposure of $H_2$ and $Cl_2$ to ultraviolet radiation 908 may effect the formation of hydrochloric acid (HCl) which may then be dissolved in an aqueous solution 904. Solution 904 may include pure water ($H_2O$), aqueous acidic solutions, or any other solution that will at least partially dissolve HCl. The heat and pressure resulting from the operation of ultraviolet source 906 may be closely monitored by a sensor 916. In some embodiments, sensor 916 may be coupled to various control and feedback systems such that temperature and pressure of compartment 902 may be maintained within a predefined operating range. As shown in FIG. 6, compartment 902 may also include an outlet 914 that is coupled to an external system to remove the aqueous HCl solution generated in compartment 902.

As discussed above, the exposure of $H_2$ and $Cl_2$ to ultraviolet radiation 908 affects the formation of HCl. However, a reaction involving $H_2$ and $Cl_2$ may be explosive if not performed in a controlled environment. Generally, a controllable $H_2$ and $Cl_2$ reaction may occur in a chlorine rich environment when the ratio $Cl_2:H_2$ is greater than 1. Given the hazards typically associated with $H_2$ and $Cl_2$ gases, in some embodiments, compartment 902 may include a sensor 947 that monitors the concentrations $Cl_2$ and $H_2$ and/or ratio of the ratio $Cl_2:H_2$ present in system 900.

Figure 7:
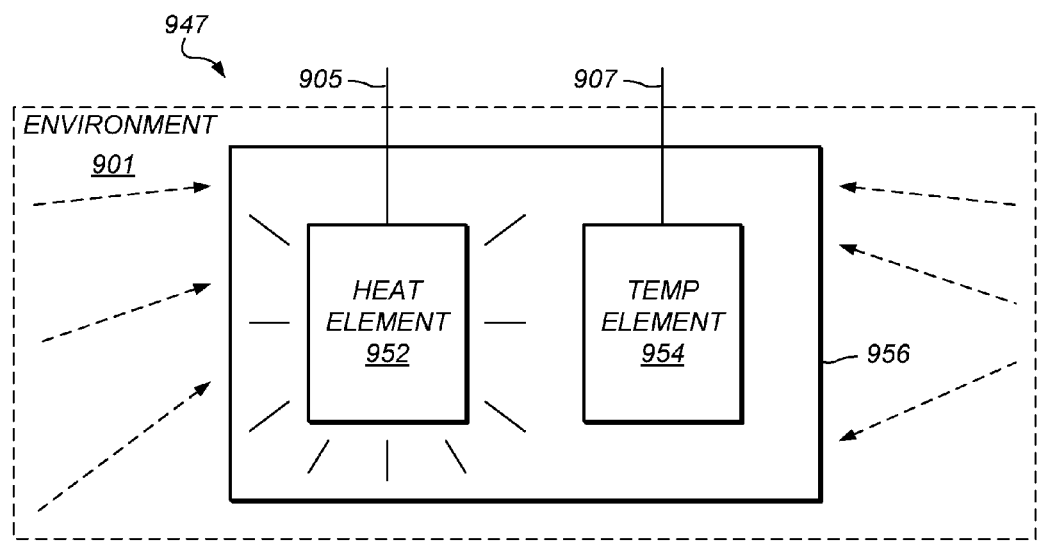
FIG. 7 depicts a concentration sensor.

FIG. 7 illustrates a block diagram of exemplary sensor 947 that may measure the ratio of $H_2:Cl_2$ (or $Cl_2:H_2$) in a given environment 901. For convenience, the following description discusses the use and operation of sensor 947 to measure the ratio $H_2:Cl_2$ (or $Cl_2:H_2$) in a $H_2$, $Cl_2$ environment such as exemplary environment 901. However, it should be understood that sensor 947 may, in turn, be used in any setting involving the combination of $H_2$ and $Cl_2$ such as, in the generation of HCl from chloro-alkali plants, neutralization of $Cl_2$, or other such settings requiring a controlled $H_2$—$Cl_2$ reaction. Furthermore, it should be understood that the use of sensor 947 is not limited to that of a $H_2$ and $Cl_2$ environment, but may be used to measure a concentration or ratio of any (and any number) of gasses in a gaseous mixture.

As shown in FIG. 7, sensor 947 may include a heat element 952 and a temperature sensing element 954. Heat element 952 may include any heat source such as a resistive heating source, or any such element capable of generating net heat (power). Temperature sensing element 954 may include any temperature sensing element, including thermocouples, thermistors, IC sensors, IR sensors, or any other device capable of measuring a temperature close to heat element 952. As shown in FIG. 7, in order to resist substantial degradation by environment 901, heat element 952 and temperature sensing element 954 may be further encapsulated in an enclosure 956. Enclosure 956 may be formed, for example, from glass, plastic, metal, or any other type of material. Furthermore, heat element 952 may be coupled to generate net power (heat) by receiving a signal via line 905 (current or voltage signal), and temperature sensing element 954 may provide a temperature signal, which results from heating from heat element 952, via line 907.

During normal operation of sensor 947, heat generated by heat element 952 may be transferred to environment 901 and enclosure 956. The rate at which heat is transferred between heat element 952 and environment 901 may depend on the thermal resistivity of environment 901 and the thermal resistivity of enclosure 956. The thermal resistivity of enclosure 956 may depend on the type and physical characteristics of the material(s) used to create enclosure 956. Typically, materials that form enclosure 956 may be chosen such that their thermal resistivity is small (negligible) when compared with the environmental thermal resistivity. As is well known, the thermal conductivity of $H_2$ is much greater than the thermal conductivity of $Cl_2$ (by approximately a factor of 15). Therefore, a change in the concentration ratio $H_2:Cl_2$ in a $H_2$, $Cl_2$ mixture (such as in an anode compartment) may cause a significant change in the thermal resistivity of environment 901. For example, if the concentration of $H_2$ in the $H_2/Cl_2$ environment 901 increases, the thermal resistivity of environment 901 may decrease because the thermal conductivity of $H_2$ is much greater than the thermal conductivity of $Cl_2$ (as mentioned above). The decrease in the thermal resistivity of environment 901 may cause more heat from heat element 952 to be dissipated to environment 901, thereby cooling heat element 952. Similarly, if the concentration of $Cl_2$ in environment 901 increases, the thermal resistivity of environment 901 may increase which, in turn, may cause less heat from heat element 952 to be dissipated to environment 901. As will be discussed in detail below, by monitoring the heat transfer between heat element 952 and environment 901, for example, by monitoring the temperature close to heat element 952 (via temperature sensing element 954), a concentration ratio of $H_2:Cl_2$ may be estimated.

Figure 8:
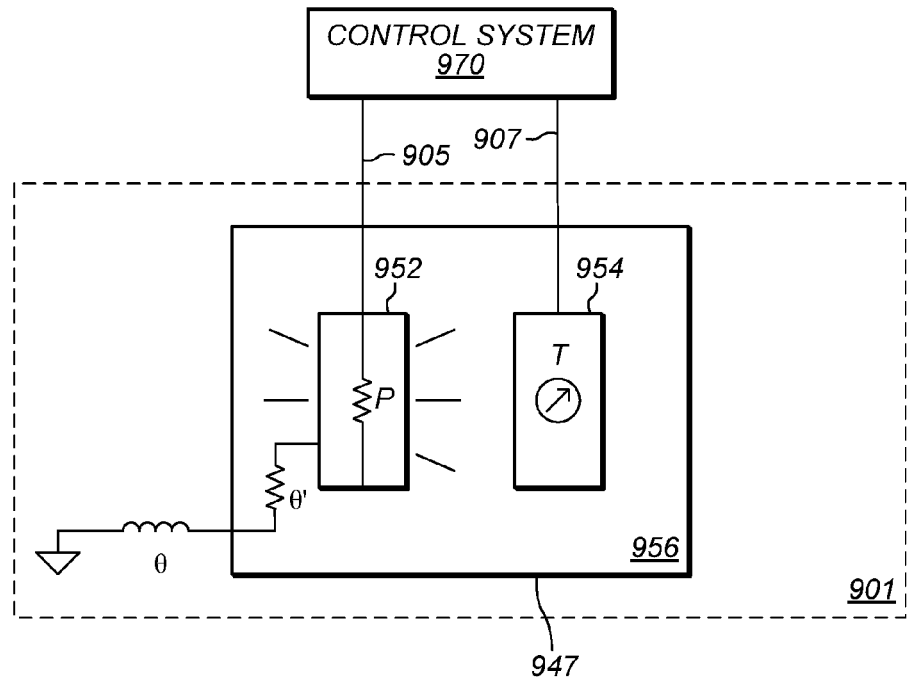
FIG. 8 depicts another embodiment of a concentration sensor.

FIG. 8 further depicts an equivalent thermal circuit diagram illustrating the operation of sensor 947. Enclosure thermal resistivity and environment thermal resistivity are depicted as (equivalent) resistors θ and θ, respectively. As discussed earlier, heat element 952 may generate a net power P by receiving (via line 905) a signal, such as a constant current, constant voltage, or any other signal capable of generating a net power across heat element 952. For example, heat element 952 may generate net heat P by receiving, from a known voltage source V, a current I via line 905. As discussed above, temperature sensing element 954 may provide (via line 907) a temperature reading T associated with heat element 952. It should be understood that temperature reading T may include any value that corresponds directly or indirectly to a given temperature sensed by temperature sensing element 954. For example, temperature reading T may include a value that may indicate the temperature sensed by temperature sensing element 954 or a value that may indicate the temperature sensed by temperature sensing element 954 relative to an ambient temperature. In some embodiments, when no heat is generated across heat element 952, temperature sensing element 954 may indicate an ambient temperature reading $T_a$ associated with environment 901.

As seen in FIG. 8, heat P generated by heat element 952 may be transferred to environment 901 and may raise the temperature at temperature sensing element 954 (temperature reading T). The temperature read by temperature sensing element 954 depends on the heat (power) P generated across heat element 952 and the heat transferred to environment 901. As discussed earlier, the rate at which heat P is transferred through environment 901 depends on the enclosure thermal resistivity θ' and environmental thermal resistivity θ. As discussed above θ' may be negligible when compared with θ, therefore;

$$T=\text{function}(P,\theta) \quad (1)$$

Furthermore, as discussed earlier with respect to FIG. 11, environmental thermal resistivity θ also depends on a ratio x of the concentrations of the $H_2$ and $Cl_2$ mixture. Therefore, $$T=\text{function}(P,\theta,x) \quad (2)$$

As seen from equation 2, ratio x of the $H_2$, $Cl_2$ concentration may be computed from temperature reading T received from temperature sensing element 954. As will be discussed in detail with respect to FIG. 5, in some embodiments, the relationship between θ and x is derived from one or more plots typically developed from laboratory measurements under controlled conditions. In some embodiments, corresponding values of θ and x derived from the plots mentioned above may be stored in a memory (not shown) that may be included as part of control and feedback circuitry 970.

Furthermore, in some embodiments, sensor 947 may be coupled to the control and feedback system 970 (via lines 905 and 907) and may be configured to calculate x based on temperature reading T and accordingly adjust the proportion (concentration) of $H_2$, $Cl_2$ in the mixture such that a controlled reaction may be maintained.

Figure 5:
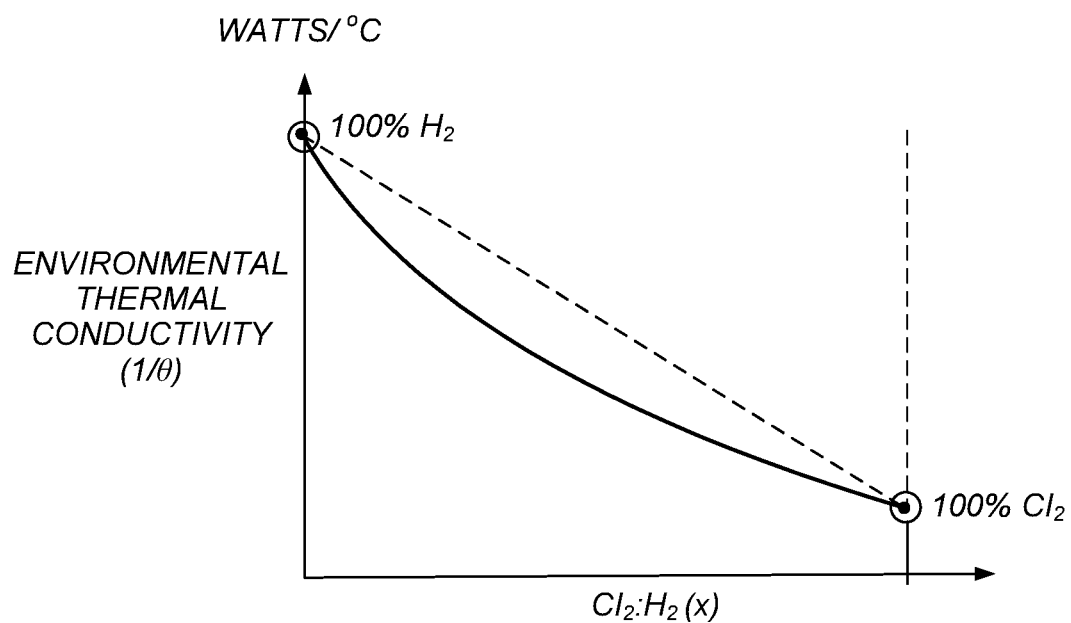
FIG. 5 depicts a plot that may be used by a sensor system.

As mentioned above, FIG. 5 is an exemplary plot depicting the relation between environmental thermal conductivity (1/θ) and ratio x. The plot depicts $Cl_2:H_2$ relative concentration ratio x on the x-axis and environmental thermal conductivity (1/θ) on the y-axis. As seen in FIG. 5, for a given θ, a corresponding value of ratio x may be obtained. Furthermore, as discussed above, corresponding values of θ and x derived from the plot depicted in FIG. 5 and may be stored in a memory included as part of relevant control and feedback circuitry 970.

Figure 9:
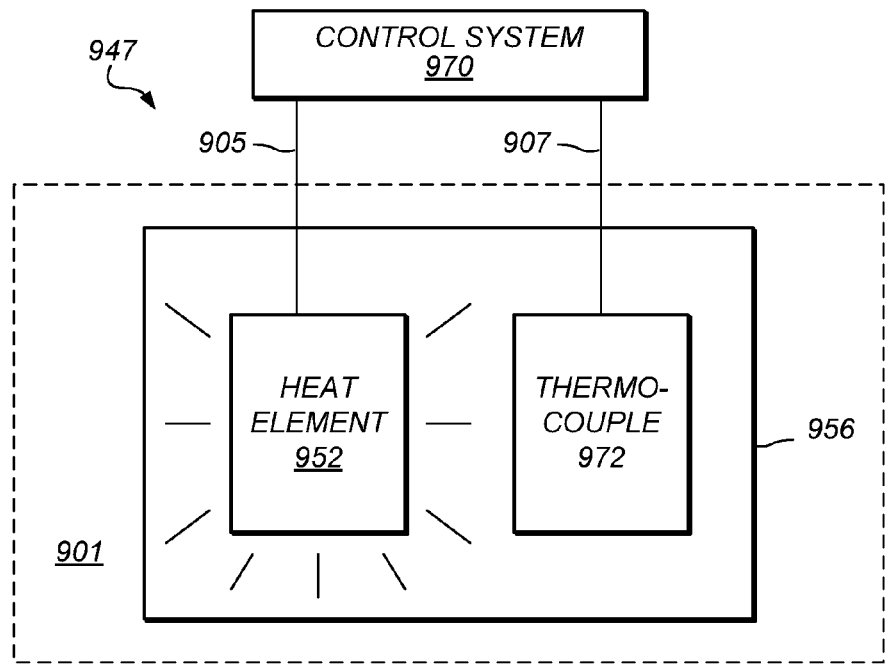
FIGS. 9, 10, and 11 depict various sensor systems.

FIG. 9 illustrates an alternate sensor 947. As shown in FIG. 9, temperature sensing element 954 is a thermocouple 972. Thermocouple 972 may be configured to provide a voltage reading V' (across line 907) in response to a temperature T sensed by temperature sensing element 954. In a manner similar to that discussed with respect to FIG. 8, a net power P may be generated across heat element 952. Furthermore, as environmental thermal resistivity θ changes due to a change in $H_2$ and $Cl_2$ ratio, the temperature sensed by thermocouple 972 may change which in turn may cause voltage reading V' to appear across line 907. In some embodiments, the relationship between V' and temperature T sensed by thermocouple 72 is derived from one or more plots typically developed from laboratory measurements under controlled conditions, as depicted in FIG. 5. In a manner similar to that discussed with respect to FIG. 5, in some embodiments, corresponding values of T and V' derived from the plots may be stored in a memory (not shown) that may be included as part of control and feedback circuitry 370. Furthermore, once temperature T is computed from voltage reading V', ratio x may be computed in a manner similar to that discussed with respect to equation 2, and control and feedback system 970 may accordingly adjust the proportion (concentration) of the $H_2$, $Cl_2$ in the mixture such that a controlled reaction may be maintained.

Figure 10:
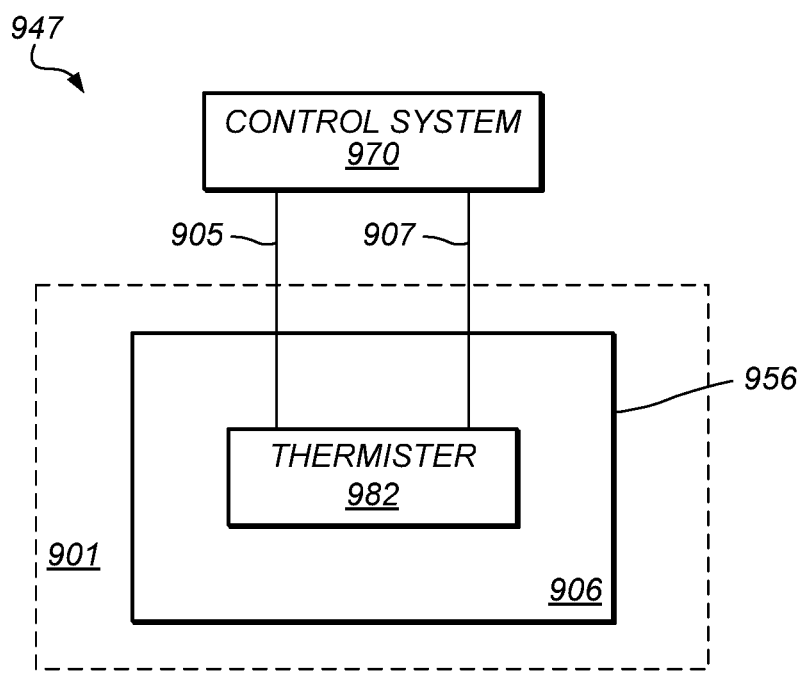

FIG. 10 illustrates a sensor 947 that is formed using a thermistor. As shown in FIG. 10, sensor 957 may include a thermistor 982 having a resistance R that varies as a function of a temperature T sensed by the environment surrounding the thermistor. Thermistor 982 includes both a heat element and temperature sensing element as shown in previous embodiments. In a manner similar to that discussed with respect to FIG. 8, a net power P may be generated across thermistor 982. For example, if net power P is generated across thermistor 982 from known voltage source V and current I, then:

$$P=I^2*R \quad (3)$$

furthermore the relationship between R and T may be expressed by the Steinhart-Hart equation as:

$$\frac{1}{T} = \frac{1}{T_0} + \frac{1}{B}\ln\left(\frac{R}{R_0}\right) \quad (4)$$

where $R_o$ is the resistance of thermistor 982 at a reference temperature $T_0$ and B is a device constant. Typically, $R_0$, $T_0$, and B are included as part of the manufacturer's specifications associated with thermistor 982.

When no heat is generated across thermistor 982 (i.e. no signal is applied across line 905), resistance R of thermistor 982 corresponds to temperature $T_a$ of environment 901. When a heat P is generated across thermistor 982, then the heat transferred ($P_t$) between thermistor 982 and the surrounding environment may be expressed as:

$$P_t = K(T - T_a) \quad (5)$$

where K is the coefficient of heat transfer. Moreover, in an equilibrium condition:

$$P = P_t \quad (6)$$

therefore from equations 3, 4, and 5, $$I^2 R = K[B/\text{Ln}(R/R_{inf}) - T_a] \quad (7)$$

where, $$R_{inf} = R_0 e^{-B/T_0}$$

Therefore, as can be seen from equation 7, because I, B, and $R_{inf}$ may be known quantities, $$R = \text{function}(K, T_a) \quad (8)$$

and because V=I*R (from Ohm's law), $$V = \text{function}(K, T_a) \quad (9)$$

Furthermore, because K is the heat transfer coefficient between thermistor 982 and environment 901, K is directly related to environmental thermal resistivity 8 (as discussed with respect to FIG. 8) which further depends on ratio x. Therefore, from equation 9:

$$V = \text{function}(x, T_a) \quad (10)$$

From equation 10, $H_2$ and $Cl_2$ ratio x is derived from known voltage source V and temperature $T_a$. In some embodiments, corresponding values of $T_a$ and V derived from equation 4 discussed above, may be stored in a memory (not shown) that, for example, is included as part of control and feedback circuitry 970. Furthermore, control and feedback system 970 may use the computed value of x, which may be utilized to adjust the proportion (concentration) of the $H_2Cl_2$ mixture such that a controlled reaction may be maintained.

Figure 11:
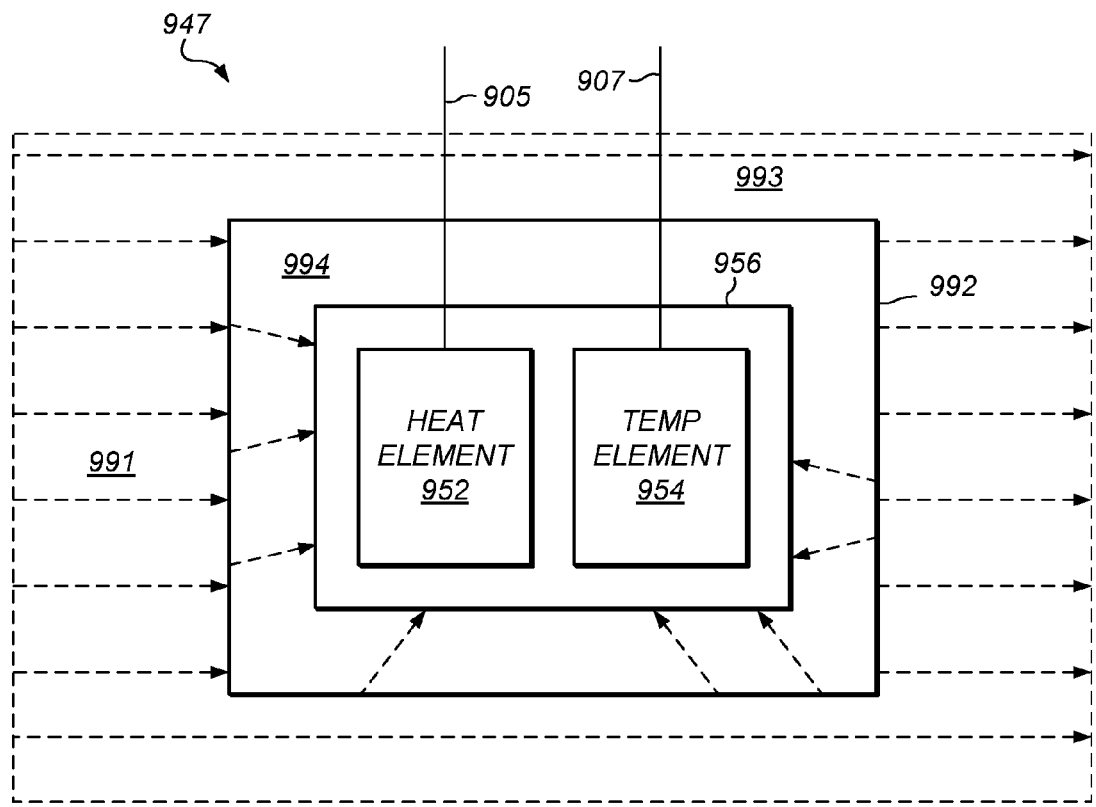

As discussed above with respect to FIGS. 7, 8, 9, and 10, sensor 947 may be used to monitor a relative concentration of a gaseous mixture that may be present in a static environment such as environment 901 that may be present in compartment 992. In some embodiments, it may be possible for environment 901 to be a dynamic environment wherein one or more gases (such as a $H_2$ and/or $Cl_2$) are moving at a constant and/or variable rate. FIG. 11 illustrates an embodiment of sensor 947 that may be used to monitor relative concentrations of a gaseous mixture in a dynamic environment 991. As shown in FIG. 11, sensor 947 may further include a porous membrane 992 that at least partially encapsulates enclosure 956 such that a space 994 exists between membrane 992 and enclosure 956. In some embodiments, membrane 992 may include a plastic membrane, or any other type of membrane that will allow gases from environment 991 to flow through it without affecting the relative concentrations of the gases.

Furthermore, as gases flow through membrane 992, the environment encapsulated by membrane 992 (in space 993) may be similar if not identical to static environment 901 discussed with respect to FIG. 8. Therefore, in a manner similar to that discussed with respect to FIG. 8, a ratio x of the relative concentration of gases (such as $Cl_2:H_2$) in dynamic environment 991 may be calculated.

In some embodiments, the resulting increase in $H^+$ in anolyte 319 may be controlled by permeable membrane 242. Ion-selective layer 315 may affect the passage of $H^+$ into cathode compartment 244 and aqueous catholyte 317. This passage typically results in a drop of anolyte level 308 because of transmission of water along with the hydrogen ions. For example, about 4 to about 6 molecules of $H_2O$ may pass with each $H^+$ molecule that traverses membrane 242 into the cathode compartment 244. This passage results in a drop in electrolyte level 308, thereby concentrating the components of electrolyte 319. Conversely, the passage of $H_2O$ into cathode compartment 244 will cause a decrease in the concentration of the components dissolved in electrolyte 317.

In some embodiments, upper sensor 332 and lower sensor 334 are disposed in anode compartment 240 to detect and control electrolyte level 308. Once electrolyte level 308 reaches lower sensor 334, anode compartment 240 is drained through outlet 340, as controlled by valve 342. Electrolyte is then re-introduced into anode compartment 240 via conduit 244 through inlet 310 until electrolyte level 308 reaches upper sensor 332. In some embodiments, a valve 346 may control the introduction of electrolyte into anode compartment 240 through conduit 312. In some embodiments, valve 312 may remain open for some period of time after electrolyte begins to fill anode compartment 240 in order to flush compartment 240. Once anode compartment 240 is refilled, power is once again applied to electrodes 294 and 292 to saturate electrolyte 319 and begin production of chlorine gas.

Electrolyte 317 may be flowed through cathode compartment 244 so that cathode compartment 244 is always full. In some embodiments, electrolyte 319 and electrolyte 317 come from the same storage tank. In some embodiments, electrolyte 319 may be sourced from a separate tank.

Figure 4:
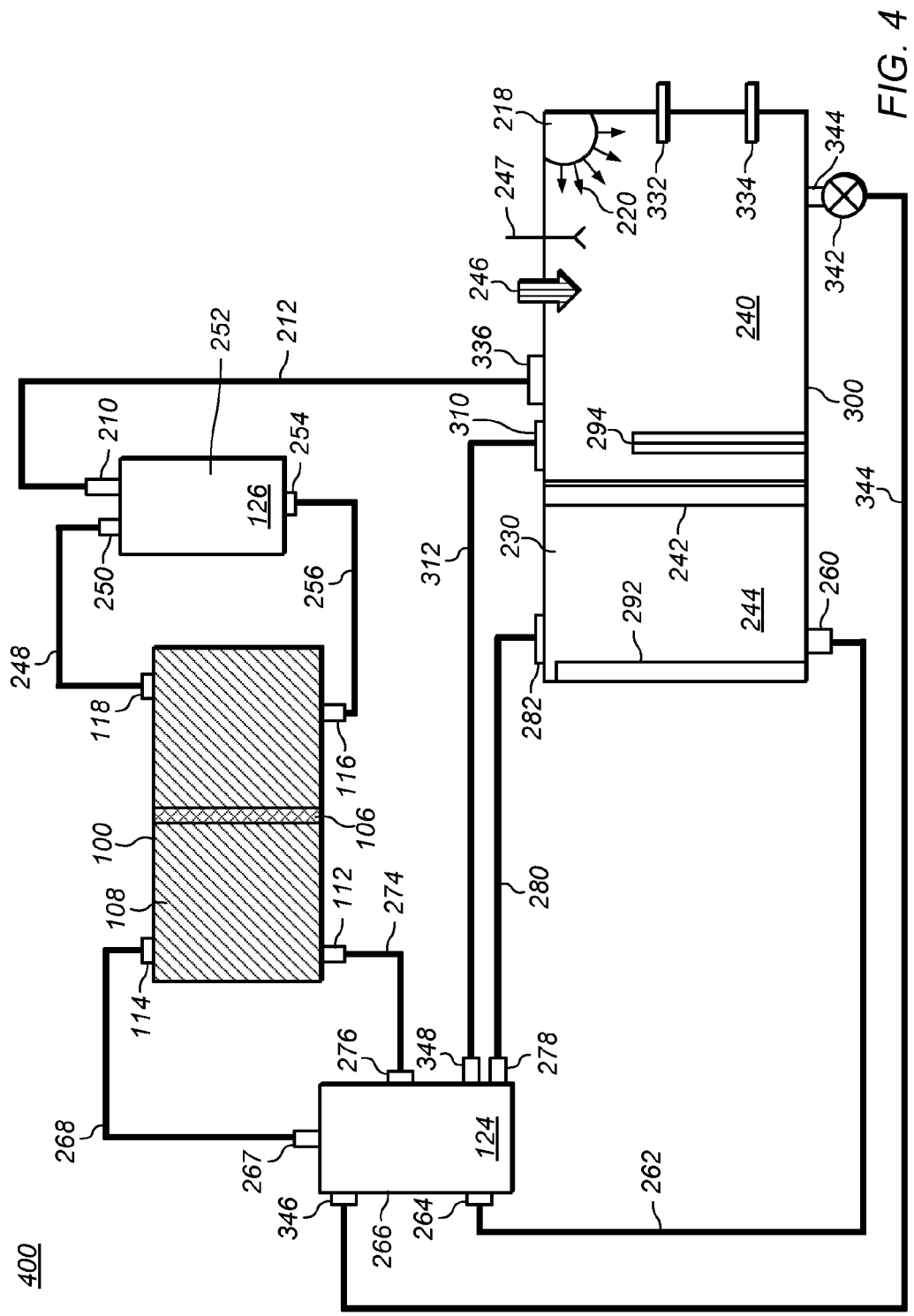
FIG. 4 depicts a redox cell coupled to a rebalancing system.

FIG. 4 illustrates a redox flow cell battery system 400 that includes redox flow cell 100 coupled to rebalancing cell 300. For convenience only, redox flow cell 100 is illustrated with a single cell that includes cathode compartment 108 and anode compartment 110 separated by membrane 106. $H_2$ produced in anode compartment 110 may be transferred from redox cell 100 through conduit 248 and into anolyte reservoir 252 through inlet 250, which also contains anolyte 126. From there, $H_2$ may be vented from outlet 210 and carried along conduit 212 and into anode compartment 240 of rebalance cell 300 via inlet 336. Rebalance cell 300 also houses cathode compartment 244. Anode compartment 240 and cathode compartment 244 are separated by porous membrane 242. Cathode compartment 244 contains cathode 292, while anode compartment 240 contains anode 294.

When anolyte in anode compartment 240 comprises aqueous HCl, the process of oxidation will effect the formation of $Cl_2$ at anode 294, which then collects at the top of anode compartment 240. $H_2$ introduced through inlet 336 also collects at the top of anode compartment 240. Anode compartment 240 includes ultraviolet source 218, which may be used to expose the $H_2$ and $Cl_2$ to ultraviolet radiation 220. Ultraviolet source 218 may be encapsulated by a shell to protect it from exposure to substances (e.g., $Cl_2$ and $H_2$) within anode compartment 240. As noted previously, the exposure of $H_2$ and $Cl_2$ to ultraviolet radiation 220 effects the formation of HCl; which then dissociates in the aqueous catholyte as $H^+$ and $Cl^-$. The heat and pressure resulting from the operation of ultraviolet source 218 may be closely monitored by sensors 246. $H_2$ and $Cl_2$ concentrations may be monitored through gas sensor 247.

Permeable membrane 242 may allow for the passage of $H^+$ into cathode compartment 244 and the aqueous catholyte contained therein. This passage typically, results in a drop in the electrolyte volume in anode compartment 240. As described previously, the level of electrolyte in anode compartment 240 is controlled to be between lower sensor 334 and upper sensor 332. In some embodiments, a drop in electrolyte level detected by lower sensor 334 will stop the flow of power and effect the draining of electrolyte through outlet 340 and valve 342. From there, the electrolyte may be transported along conduit 344 and into catholyte reservoir 266 via inlet 346. Electrolyte may then be flowed from outlet 348 and along conduit 312 to refill anode compartment 240 via inlet 310. In some embodiments, valve 342 may remain open for some period of time after electrolyte begins to fill anode compartment 240 in order to flush compartment 240. Once anode compartment 240 is refilled, power is once again applied to electrodes 294 and 292 to begin production of chlorine gas.

In embodiments, the refilling of anode compartment 240 may be accomplished by a second arm off of conduit 274. For example, in some embodiments, battery system 400 may lack conduit 312. Thus, in some embodiments, a second arm off of conduit 274 (not shown) may be implemented to effect the transfer of electrolyte to anode compartment 240 via inlet 310 for refilling. In some embodiments, valve(s) may be implemented to control the fill.

Passage of $H^+$ into cathode compartment 244 will result in a rise in the level of the catholyte and $H^+$ present therein. Restoration of the appropriate catholyte level may be achieved by draining a volume of the catholyte through conduit 262 via outlet 260. The catholyte is transported along conduit 262 and into catholyte reservoir 266 via inlet 264. There, the catholyte may be equilibrated and again dispelled via outlet 278. Equilibrated catholyte from catholyte reservoir 266 may be used to replace the catholyte drained from cathode compartment 244 through conduit 280 and inlet 282.

Alternatively, in some embodiments, catholyte from cathode compartment 244 may be placed in fluid communication with catholyte reservoir 266 by other means. For example, in some embodiments, redox battery system 400 may lack conduit 262. Thus, in some embodiments, a second arm off of conduit 274 may be implemented to affect the transfer of electrolyte from cathode compartment 244 to catholyte reservoir 266. In some embodiments, valve(s) may be implemented to control the transfer.

Catholyte in cathode compartment 108 of redox flow cell 100 may be drained through outlet 112 and replenished in catholyte reservoir 266 via conduit 274 and inlet 276. Replenished catholyte 124 exits catholyte reservoir 266 though outlet 267, which is then transported through conduit 268 and reintroduced into cathode compartment 108 via inlet 114. Similarly, anolyte reservoir 252 feeds fresh anolyte 126 from outlet 250 into anode compartment 110 via conduit 248 and inlet 118. Once depleted, the anolyte may be drained from anode compartment 110 through outlet 116 and transported along conduit 256 for reintroduction into anolyte reservoir 252 via inlet 254.

Alternative I/O port and conduit placements will be obvious to persons of ordinary skill in the art. For example, in some embodiments, inlet 346 may be placed at the top of catholyte reservoir 266, instead of the side as depicted in FIG. 4. Other rearrangements to I/O port and conduit placements depicted in FIG. 4 are obvious and have the ability to effect similar results.

Figure 12:
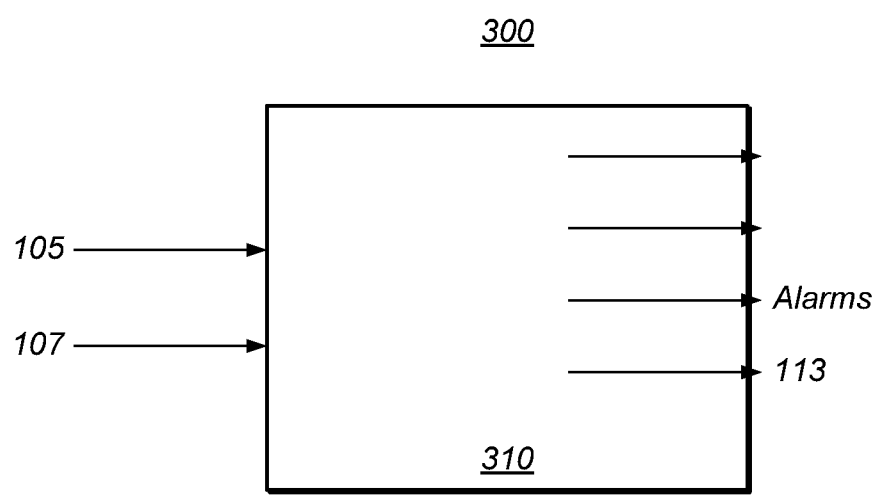
FIG. 12 illustrates a control system for a photochemical chamber.

FIG. 12 illustrates a control system 300 for controlling photochemical system 200. An example of a control system, is described in U.S. patent application entitled "Control System for a Flow Cell Battery", filed concurrently herewith, which claims priority to U.S. Provisional Patent Application No. 61/182,660 entitled "Control System for a Flow Cell Battery", filed May 28, 2009, both of which are incorporated herein by reference. As shown in FIG. 12, control system 300 includes a controller 310. Controller 310 includes one or more processors, volatile and non-volatile memory to store data and programming, analog-to-digital converters to receive and digitize data, and digital-to-analog converters to provide variable signals as needed. As shown in FIG. 12, controller 310 may receive signals related to, for example, temperature and pressure from sensors 105, and signals related to the concentration of hydrogen to chlorine gas from sensor 107. From these input signals, controller 310 provides alarms if an overpressure or over temperature situation develops, and controls the introduction of hydrogen and chlorine into the photochemical chamber by activating valves. In addition, controller 310 may affect the activation of the ultraviolet radiation source.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing hydrogen chloride, comprising:
   collecting chlorine gas from a redox flow cell battery system;
   introducing hydrogen and the collected chlorine gas into at least one photochemical chamber containing at least one source of ultraviolet radiation;
   activating the at least one source of ultraviolet radiation, thereby exposing the hydrogen and the chlorine to ultraviolet radiation to produce chlorine gas; and
   collecting the produced hydrogen chloride;
   wherein the at least one photochemical chamber further comprises at least one sensor for monitoring the ratio of the concentration of hydrogen to chlorine in the chamber; and wherein the method further comprises monitoring the ratio of the concentration of hydrogen to chlorine in the chamber.

2. The method of claim 1, wherein the at least one source of ultraviolet radiation emits light at wavelengths of about 370 nm to about 430 nm.

3. The method of claim 1, wherein the at least one photochemical chamber further comprises at least one gauge for monitoring temperature and/or pressure in the chamber; and wherein the method further comprises monitoring the temperature and/or pressure in the photochemical chamber.

4. The method of claim 1, further comprising absorbing the formed hydrogen chloride into water to form hydrochloric acid.

5. A method of producing hydrogen chloride, comprising:
collecting hydrogen gas from a redox flow cell battery system;
introducing the collected hydrogen gas and chlorine gas into at least one photochemical chamber containing at least one source of ultraviolet radiation and at least one sensor for monitoring a ratio of a molar concentration of hydrogen gas to chlorine gas in the chamber;
activating the at least one source of ultraviolet radiation, thereby exposing the hydrogen gas and the chlorine gas to ultraviolet radiation to produce hydrogen chloride;
monitoring the ratio of the concentration of hydrogen gas to chlorine gas in the chamber; and
collecting the produced hydrogen chloride.

6. The method of claim 5, wherein the chlorine gas is collected from the redox flow cell battery system.

7. The method of claim 5, wherein the at least one source of ultraviolet radiation emits light at wavelengths of about 370 nm to about 430 nm.

8. The method of claim 5, wherein the at least one photochemical chamber further comprises at least one gauge for monitoring temperature and/or pressure in the chamber; and wherein the method further comprises monitoring the temperature and/or pressure in the photochemical chamber.

9. The method of claim 5, further comprising absorbing the formed hydrogen chloride into water to form hydrochloric acid.

10. The method of claim 5 wherein the process of monitoring the ratio of the concentration of hydrogen gas to chlorine gas in the chamber occurs while the hydrogen gas and chlorine gas are being exposed to the ultraviolet radiation.

11. The method of claim 5 wherein the process of monitoring the ratio of the concentration of hydrogen gas to chlorine gas in the chamber includes monitoring a thermal resistivity of the hydrogen gas and chlorine gas in the chamber.

12. The method of claim 5 wherein the at least one sensor for monitoring the ratio of the concentration of hydrogen gas to chlorine gas includes a heat element and a temperature sensor.

13. The method of claim 12 wherein the process of monitoring the ratio of the concentration of hydrogen gas to chlorine gas in the chamber comprises:
introducing heat using the heat element; monitoring the temperature using the temperature sensor;
determining a thermal resistivity in the chamber based as least on the introduced heat and the monitored temperature; and
determining a ratio of the concentration of hydrogen gas and chlorine gas in the chamber based at least on the thermal resistivity.

14. A redox flow cell battery system comprising:
a redox flow cell, the redox flow cell comprising:
positive and negative electrodes disposed in separate half-cell compartments;
a porous or ion-selective membrane separating the half-cell compartments;
and an electrolyte that is flowed through the half-cell compartments, wherein the electrolyte comprises chromium ions and iron ions; and a
chamber, comprising an ultraviolet light source, coupled to one or both half-cell compartments, wherein during operation of the flow battery system the chamber collects hydrogen and/or chlorine gas from one or both half-cell compartments and produces hydrogen chloride from the collected gas; wherein the
chamber further comprises at least one sensor for monitoring the ratio of the concentration of hydrogen to chlorine in the chamber; and wherein the sensor is configured to monitor the ratio of the concentration of hydrogen to chlorine in the chamber.

* * * * *